(12) United States Patent
Ward, Jr. et al.

(10) Patent No.: US 10,928,140 B2
(45) Date of Patent: Feb. 23, 2021

(54) BAFFLE ASSEMBLY AND HEAT EXCHANGER WITH EXPANDING BAFFLES

(71) Applicant: Giles Enterprises, Inc., Montgomery, AL (US)

(72) Inventors: James H. Ward, Jr., Deatsville, AL (US); Craig S. Yost, Montgomery, AL (US)

(73) Assignee: Giles Enterprises, Inc., Montgomery, AL (US)

( * ) Notice: Subject to any disclaimer, the term of this patent is extended or adjusted under 35 U.S.C. 154(b) by 13 days.

(21) Appl. No.: 16/140,695

(22) Filed: Sep. 25, 2018

(65) Prior Publication Data

US 2020/0096263 A1  Mar. 26, 2020

(51) Int. Cl.
| | |
|---|---|
| *F28F 1/40* | (2006.01) |
| *F28F 13/12* | (2006.01) |
| *F28D 1/047* | (2006.01) |
| *A47J 37/12* | (2006.01) |

(52) U.S. Cl.
CPC ............. *F28F 1/40* (2013.01); *A47J 37/1276* (2013.01); *F28D 1/0475* (2013.01); *F28F 13/12* (2013.01); *F28F 2210/10* (2013.01)

(58) Field of Classification Search
CPC .................................. F28F 1/40; F28F 13/12
USPC ......................................... 165/109.1; 138/38
See application file for complete search history.

(56) References Cited

U.S. PATENT DOCUMENTS

| | | | | |
|---|---|---|---|---|
| 1,691,979 | A * | 11/1928 | Lochen | F22B 37/06 138/38 |
| 3,170,511 | A * | 2/1965 | Guthrie | F28D 7/106 165/108 |
| 3,633,663 | A * | 1/1972 | Tafel | B41F 23/0479 165/109.1 |
| 3,736,961 | A * | 6/1973 | Walsh | F15D 1/02 138/38 |
| 4,187,905 | A * | 2/1980 | Isenberg | F24B 7/005 165/181 |
| 4,794,980 | A * | 1/1989 | Raisanen | F28F 13/12 165/109.1 |
| 8,980,102 | B2 | 3/2015 | Florkey et al. | |
| 9,605,913 | B2 * | 3/2017 | Al-Otaibi | F28F 13/12 |
| 2002/0069767 | A1 | 6/2002 | Wendel et al. | |
| 2007/0089732 | A1 | 4/2007 | Ricord et al. | |
| 2011/0048248 | A1 | 3/2011 | Manson et al. | |
| 2014/0020568 | A1 | 1/2014 | Huang et al. | |

* cited by examiner

*Primary Examiner* — Leonard R Leo
(74) *Attorney, Agent, or Firm* — Slavitt IP Law

(57) ABSTRACT

An improved baffle assembly for heat exchanger tubes comprising a shaft and at least one opposing pair of expanding baffles positioned coaxially on the shaft, each expanding baffle comprising a central hub portion and a plurality of extension portions each radiating outward from the hub portion at complementary oblique angles so that the central hub portions of each baffle are spaced apart along the shaft and the distal ends of the extension portions of each baffle are brought into physical contact.

10 Claims, 2 Drawing Sheets

BAFFLE ASSEMBLY AND HEAT EXCHANGER WITH EXPANDING BAFFLES

FIELD OF THE INVENTION

An improved baffle assembly and heat exchanger with expanding baffles used in cooking equipment. Specifically, the improved baffle assembly and heat exchanger includes expanding baffles which can be installed in new gas powered fryers or retrofitted within heat exchangers of old gas fryers to increase the efficiency of heat transfer via gas flow disruption and heat conduction.

BACKGROUND

Deep-fat fryers are common cooking appliances used in restaurants, institutional kitchens, and fast-food establishments for cooking a variety of food products, such as French fries, fish, chicken, and the like. The food product is cooked by totally immersing it within a vat or tank that is filled with oil or shortening heated up to about 350° F. The oil may be heated using a heat exchanger, which may take the form of one or more heat exchange tubes that run through the cooking vat below the surface of the oil through which heated gas is forced or drawn. A gas burner may be provided at one end of the heat exchanger tube to heat the gas circulating therethrough so that the heat is transferred to the cooking oil. A flue may be provided on the opposite end of the heat exchanger tube to permit the controlled discharge of combustion by-products. In operation, heated gas travels through the heat exchanger tube which heats its inner walls via convection. In some fryers, the heat exchanger tube that runs through the cooking vat contains one or more bends or turns to lengthen the portion of the heat exchanger tube in contact with the oil thereby increasing the surface area available for heat transfer to the oil.

In the operation of fryers, maintaining a consistent oil temperature is preferred. The placement of food items in the oil bath, particularly frozen food items, reduces the temperature of the oil. Food cooked at temperatures below the optimum temperature will retain oil, become soggy, and generally not exhibit the desired crispness. Thus, it is preferable to have a quick recovery in oil temperature after food is placed in the oil. While a quick recovery time may be achieved with powerful burners, doing so with greater efficiency is more challenging.

It is known in art to increase heat transfer efficiency in fryers by incorporating baffles and other structural elements within the flow passages of heat exchanger tubes to impart turbulence and retard the flow of heated gas through the system in order to increase the efficiency of heat transfer. Energy-efficient fryers employing such conventional baffles, however, are more complicated to manufacture and are usually more expensive than simpler, less efficient fryers. Moreover, the baffles they employ are not readily adaptable to existing, low-efficiency fryers.

There remains a need to improve heat transfer efficiency in new fryers and to easily and affordably retrofit old fryers. While nominal improvements have been made in the past, the present invention represents a significant improvement in efficiency of both new and existing fryers, in terms of energy, ease, adjustability, and cost of operation.

SUMMARY OF THE INVENTION

According to one aspect of the invention, there is provided an improved baffle assembly comprising a shaft and at least one opposing pair of expanding baffles positioned coaxially on the shaft, each expanding baffle comprising a central hub portion and a plurality of extension portions each radiating outward from the hub portion at complementary oblique angles so that the central hub portions of each baffle are spaced apart along the shaft and the distal ends of the extension portions of each baffle are brought into physical contact. The distal ends of the extension portions may be provided with complementary engagement members, such as teeth, grooves, pins, or the like, to stabilize the engagement of the distal ends of complementary extension portions. One or more spacers may be positioned on the shaft in order prevent the at least one pair of expanding baffles from sliding along the axis of the shaft when assembled. Spacers may also be positioned along the shaft between opposing pairs of expanding baffles.

The shaft may be provided with a threaded end capable of accommodating a nut for maintaining the pairs of baffles on the shaft and for compressing the pairs of baffles together. The baffle assembly may be installed as part of a newly constructed fryer, heat exchanger, and other similar system, or as a simple, affordable, after-market baffle system to increase the energy efficiency of existing fryers, heat exchangers, and other similar systems through retrofitting and modification.

According to another aspect of the invention, there is provided an improved heat exchanger comprising at least one heat exchanger tube for the passage of a heated gas and a baffle assembly positioned within the at least one heat exchanger tube wherein the baffle assembly comprises a shaft having a threaded end and at least one opposing pair of expanding baffles positioned coaxially on the shaft, each expanding baffle comprising a central hub portion and a plurality of extension portions each radiating outward from the hub portion at complementary oblique angles so that the central hub portions of each baffle are spaced apart along the shaft and the distal ends of the extension portions of each baffle are brought into physical contact. In another embodiment, the heat exchanger comprises at least one heat exchanger tube for the passage of a heated gas and a plurality of baffle assemblies positioned within the at least one heat exchanger tube. In yet another embodiment, the heat exchanger comprises a plurality of heat exchanger tubes for the passage of a heated gas and a plurality of baffle assemblies positioned within each heat exchanger tube.

Engagement of the threaded end of the shaft of the baffle assembly with either a nut or a tapped hole within heat the exchanger tube causes the at least one pair of expanding baffles to compress against each other so that the central hub portions of each pair of baffles move closer together and the extension portions of each pair of baffles flatten and expand outward to bear against the inner wall of the heat exchanger tube. So configured, the baffle assembly forms a series of fixed passageways that act to increase flow turbulence of heated gas while the baffles themselves provide multiple points of direct contact with the heat exchanger tube to promote heat transfer from the baffles to the inner wall of the heat exchanger tube via conduction and increase the efficiency of the entire system.

BRIEF DESCRIPTION OF THE FIGURES

Objectives and advantages disclosed herein will be understood by reading the following detailed description in conjunction with the drawings, in which.

DETAILED DESCRIPTION

In the description herein, numerous specific details are provided, such as examples of components and/or methods, to provide a thorough understanding of embodiments of the present invention. One skilled in the relevant art will recognize, however, that an embodiment of the invention may be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Furthermore, the term "or" as used herein is generally intended to mean "and/or" unless otherwise indicated. Combinations of components or steps will also be considered as being noted, where terminology is foreseen as rendering the ability to separate or combine is unclear. As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

It is intended that the invention not be limited to the particular terms used in the appended claims and/or to the particular embodiment disclosed as the best mode contemplated for carrying out this invention, but that the invention will include any and all embodiments and equivalents falling within the scope of the appended claims. Thus, the scope of the invention should not be limited to specific embodiments shown and described, but should also include all changes and modifications which come within the scope of the appended claims.

Figure 1:
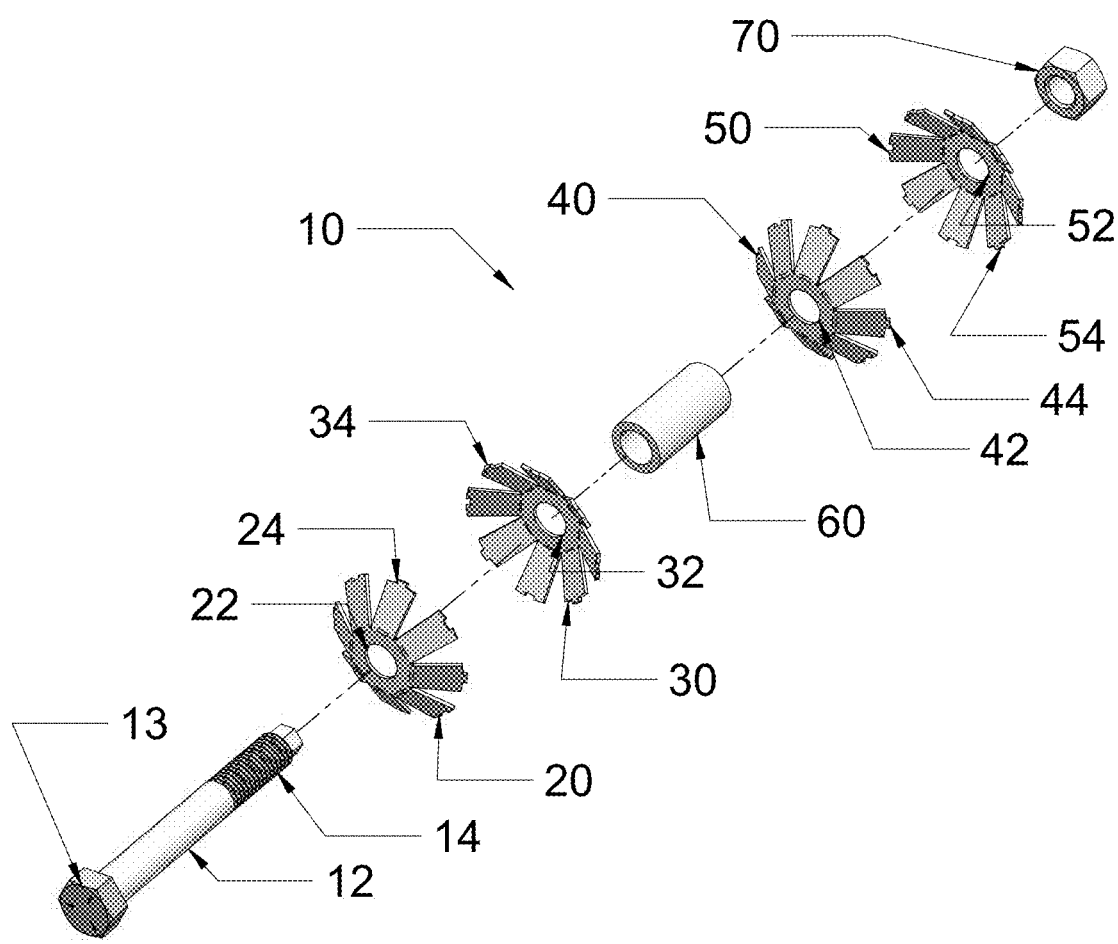
FIG. 1 shows an exploded view of an exemplary baffle assembly.

Referring to the embodiment shown in FIG. 1, one aspect of the present invention is a baffle assembly 10 comprising a shaft 12 having a threaded portion 14, two pairs of expanding baffles 20, 30, 40, and 50 mounted coaxially on the shaft 12, a spacer 60 mounted coaxially on the shaft 12 between each pair of expanding baffles, and a nut 70 mounted on the threaded portion 14 of the shaft 12. In another embodiment, the baffle assembly may comprise only one pair of expanding baffles. In a yet another embodiment, the baffle assembly may comprise three or more pairs of baffles.

Each expanding baffle 20, 30, 40, and 50 comprises a central hub portion 22, 32, 42, and 52, and extension portions 24, 34, 44, and 54, wherein each extension portion radiates outward from the hub portion to which it is attached. When baffles are arranged in opposing pairs, the extension portions 24, 34, 44, and 54 of each baffle 20, 30, 40, and 50 extend outward at complementary oblique angles so that the central hub portions 22, 32, 42, and 52 of each baffle pair are spaced apart along the shaft 12 and the distal ends of the extension portions 24, 34, 44, and 54 of each baffle pair are brought into physical contact. As shown in FIG. 1, the distal ends of the extension portions 24, 34, 44, and 54 may be provided with interlocking engagement members, such as teeth, grooves, pins, or the like, to stabilize the engagement of the distal ends of complementary extension portions of each baffle pair. In another embodiment, the distal ends of the extension portions 24, 34, 44, and 54 may be provided with complementary profiles to permit stable engagement without the use of interlocking engagement members.

While shaft 12 as shown in FIG. 1 is a hex bolt having a head 13 and a threaded portion 14, shaft 12 may be any suitably rigid, elongated structure capable of accommodating at least one pair of expanding baffles and a mechanism for compressing the pairs of baffles together. Suitable mechanisms for compressing baffle pairs include, but are not limited to, a nut, a ratchet, a pawl, or other similar mechanism capable of applying an axially compressive force on pairs of baffles. The baffle assembly of the present invention may be used, singly or in combination, in one or more heat exchanger tubes to impart greater turbulence to the flow of heated gas and to provide multiple points of physical contact with the inside surface of the heat exchanger tubes for heat conduction, increasing efficiency of the entire system.

Figure 2:
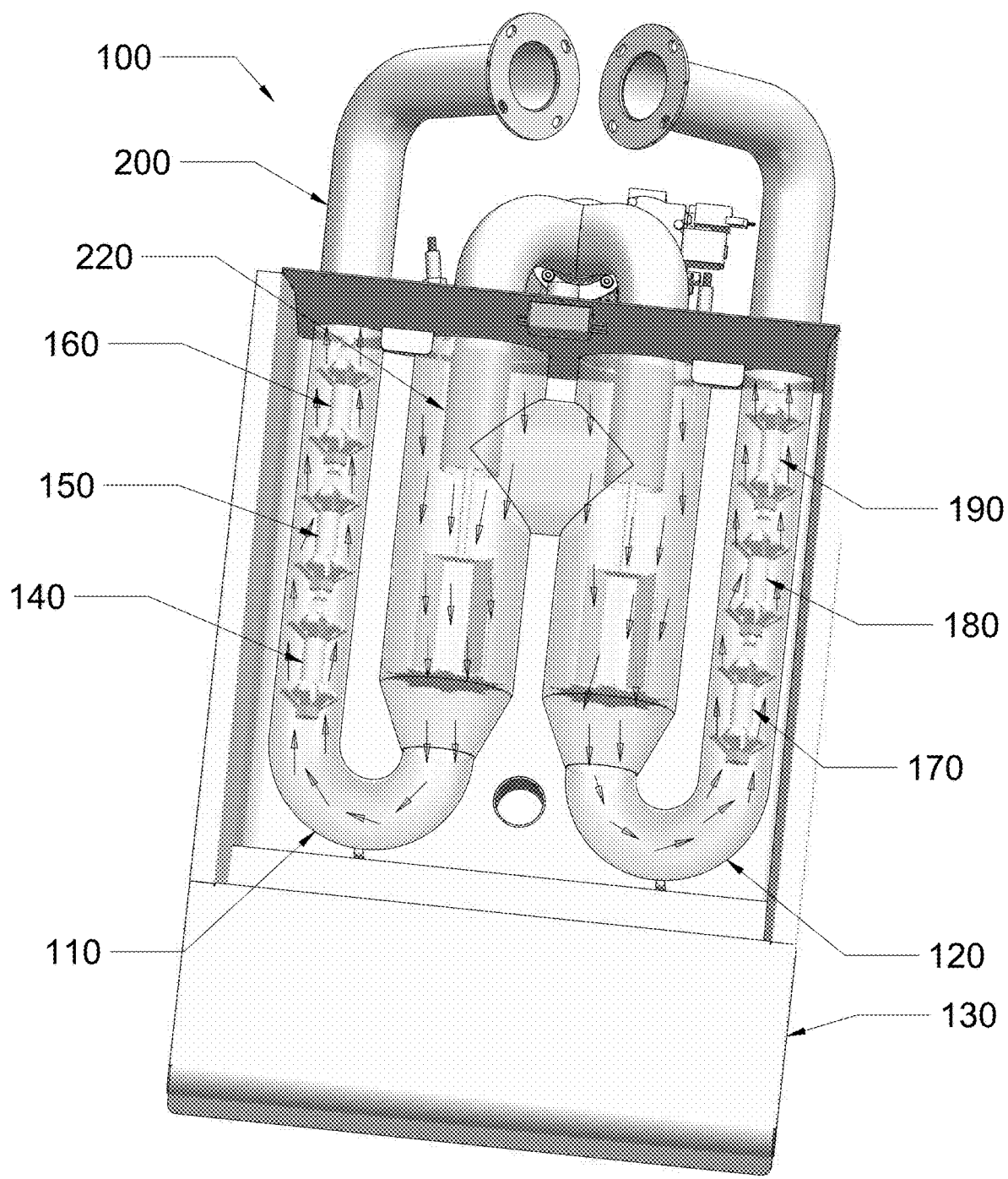
FIG. 2 shows an overhead view of a heat exchanger within a fryer in which baffle assemblies are positioned in series within the heat exchanger tubes.

Referring to the embodiment shown in FIG. 2, another aspect of the present invention is a heat exchanger 100, comprising first and second heat exchanger tubes 110 and 120 for the passage of a heated gas through fryer 130, a first series of baffle assemblies 140, 150, and 160 positioned within the first heat exchanger tube 110, and a second series of baffle assemblies 170, 180, and 190 positioned within the second heat exchanger tube 120. While the heat exchanger shown in FIG. 2 comprises two heat exchanger tubes, heat exchangers within the scope of the present invention may comprise a single heat exchanger tube or a plurality of heat exchanger tubes. Further, while the heat exchanger tubes shown in FIG. 2 are each provided with a single, 180 degree turn, heat exchanger tubes within the scope of the present invention may comprise a straight tube (i.e., having no turns) or tube having a plurality of turns. As the number of turns increases the path traveled by heated gases lengthens as well as the residence time of heated gases within the fryer.

The baffle assembly of FIG. 1 may be installed in heat exchanger tubes, either singly or in series. As shown in FIG. 2, baffle assemblies 140, 150, and 160 are provided in series in heat exchanger tube 110, and similarly, baffle assemblies 170, 180, and 190 are provided in series in heat exchanger tube 120 wherein each baffle assembly comprises a shaft having a threaded end and two opposing pairs of expanding baffles positioned coaxially on their respective shaft, each expanding baffle comprising a central hub portion and a plurality of extension portions, each radiating outward from their respective hub portion at complementary oblique angles so that the central hub portions of each baffle are spaced apart along the shaft and the distal ends of the extension portions of each baffle are brought into physical contact. Each series of baffle assemblies may also comprise one or more spacers between pairs of expanding baffles and/or between baffle assemblies themselves.

For the style of fryer 130 shown in FIG. 2, one method for installing expanding heat baffles in a heat exchanger involves removing the exhaust pipes 200 and 210 (and/or any other items blocking access to an open end of heat exchanger tubes 110 and 120), inserting the baffle assemblies into heat exchanger tube 110 and 120. Referring to FIG. 1, each baffle assembly is secured within the heat exchanger tube by advancing nut 70 along threaded portion 14 of shaft 12 such that the hub portions of each pair of expanding baffles compress against each other, deforming the extension portions such that they flatten out and increase in diameter. By flattening out and increasing the diameter of the extension portions of the expanding baffles within the heat exchanger tube, the distal ends of the extension portions bear against the inner wall of the heat exchanger tube and secure the baffle assembly within the heat exchanger tube.

Once installed, exhaust pipes 200 and 210 (and/or any other items previously removed) are replaced, and the system is charged with gas, and ignited. Once heated gas flows through burners 220 and 230 and heat exchanger tubes 110 and 120, it will be slowed and disrupted by the baffle assemblies 140, 150, 160, 170, 180, and 190, which will themselves be heated, providing more efficient heat transfer to the oil bath on the fryer 130.

The foregoing heat transfer improvement can be easily adapted to other cooking equipment such as, for example, pasta cookers and rethermalizers.

What is claimed is:

1. A baffle assembly comprising:
   a shaft; and
   at least one opposing pair of expanding baffles positioned coaxially on the shaft, wherein each baffle has a central hub portion and a plurality of extension portions, each extension portion radiating outward to a distal end from its respective hub portion at complementary oblique angles so that the central hub portions of each baffle are spaced apart along the shaft and the distal ends of the extension portions of each baffle are brought into physical contact and compressed together so that distal ends of the extension portions expand outwardly away from the shaft, and wherein the distal ends of the extension portions of each expanding baffle are provided with interlocking engagement members.

2. The baffle assembly of claim 1, comprising at least two opposing pairs of expanding baffles positioned coaxially on the shaft, wherein each baffle has a central hub portion and a plurality of extension portions, each extension portion radiating outward from its respective hub portion at complementary oblique angles so that the central hub portions of each baffle pair are spaced apart along the shaft and the distal ends of the extension portions of each baffle pair are brought into physical contact and compressed together so that distal ends of the extension portions expand outwardly away from the shaft.

3. The baffle assembly of claim 2 further comprising a spacer positioned along the shaft between the at least two pairs of expanding baffles.

4. The baffle assembly of claim 1, wherein the shaft is provided with a threaded end.

5. The baffle assembly of claim 4, further comprising a nut positioned on the threaded end of the shaft, wherein advancement of the nut along the threaded end of the shaft compresses together extension portions so that the distal ends thereof expand outwardly away from the shaft.

6. A heat exchanger, comprising:
   a heat exchange tube having an inner surface, and
   at least one baffle assembly positioned within the heat exchange tube, wherein the at least one baffle assembly comprises a shaft and at least one opposing pair of expanding baffles positioned coaxially on the shaft, wherein each expanding baffle has a central hub portion and a plurality of extension portions, each extension portion radiating outward from its respective hub portion at complementary oblique angles so that the central hub portions of each baffle are spaced apart along the shaft and the distal ends of the extension portions of each baffle are brought into physical contact and compressed together so that distal ends of the extension portions expand outwardly away from the shaft and bear against the inner surface of the heat exchange tube, and wherein the distal ends of the extension portions of each expanding baffle are provided with interlocking engagement members.

7. The heat exchanger of claim 6, comprising a plurality of said baffle assemblies positioned in series within the heat exchange tube.

8. The heat exchanger of claim 6, comprising a plurality of heat exchanger tubes.

9. The heat exchanger of claim 8, wherein each heat exchanger tube is provided with at least one said baffle assembly.

10. The heat exchanger of claim 8, wherein each heat exchanger tube is provided with a plurality of said baffle assemblies positioned in series within each heat exchange tube.

* * * * *